United States Patent [19]

Bantner

[11] 3,946,365

[45] Mar. 23, 1976

[54] GRAPHIC SYMBOL GENERATOR

[76] Inventor: John A. Bantner, Los Angeles, Calif.

[22] Filed: Dec. 13, 1973

[21] Appl. No.: 424,220

[52] U.S. Cl. ...... 340/172.5; 178/DIG. 22; 315/365; 340/324 A; 340/324 AD; 354/7

[51] Int. Cl.$^2$. G06F 15/20; G06F 3/14; B41B 19/14

[58] Field of Search .......................... 96/41, 119 PQ; 178/DIG. 22; 315/365, 367; 340/324 A, 324 AD, 172.5; 354/7; 444/1

[56] References Cited

UNITED STATES PATENTS

| | | | |
|---|---|---|---|
| 3,182,126 | 5/1965 | Ascoli | 340/324 A X |
| 3,305,841 | 2/1967 | Schwartz | 340/172.5 |
| 3,471,848 | 10/1969 | Manber | 340/324 AD |
| 3,614,767 | 10/1971 | Carrell | 340/324 AD |
| 3,643,251 | 2/1972 | Kolb et al. | 354/7 X |
| 3,648,271 | 3/1972 | McConnell et al. | 340/324 A |
| 3,786,477 | 1/1974 | Baumgartner | 340/324 AD |
| 3,803,583 | 4/1974 | Manber | 340/324 AD |
| 3,821,729 | 6/1974 | Schultze | 340/324 A |

OTHER PUBLICATIONS (S 23,730,027 Coleman, A.H., The Use of Computers in Editing and Composition. In IEEE Trans. Aero. and Elec. Sys. AES-6(6) p. 804–810., Nov. 1970.

*Primary Examiner*—R. Stephen Dildine, Jr.
*Attorney, Agent, or Firm*—Lindenberg, Freilich, Wasserman, Rosen & Fernandez

[57] ABSTRACT

Apparatus for generating graphic symbols on a cathode-ray tube employs a beam control system which starts each of a plurality of parallel strokes required for each symbol at the bottom, using a programmed offset for symbols which extend below a baseline, and to otherwise move a symbol in the X and Y axes from a position routinely specified as spaced symbols are displayed in a line. The slope of the strokes for a symbol is controlled for italicizing the symbols by programming the relative magnitudes and signs of inputs to X and Y integrators which generate ramp signals added to symbol positioning signals. The beam is turned on and off during each stroke in response to a programmed and clocked bit stream of coded digital signals. The size of a symbol is controlled by programming the clock rate for the beam on-off control and the magnitudes of the inputs to the X and Y integrators.

16 Claims, 5 Drawing Figures

GRAPHIC SYMBOL GENERATOR

BACKGROUND OF THE INVENTION

This invention relates to graphic symbol generators, and more particularly to improvements in the generation of high-quality graphic symbols such as letters, numerals, punctuation marks and the like, commonly used for composing lines of information for display, or recording on film, under control of a programmed data processing system.

The current practice in generating graphic symbols with a cathode-ray tube (CRT) for display, or recording on film, is to position the electron beam at a starting point for the symbol and deflecting the beam through a sequence of parallel strokes covering the area of the symbol while modulating the beam intensity, i.e., while turning the beam on and off. The data for the control of beam intensity is stored in the memory of the data processor as a bit stream of packed fields that are read out serially and unpacked as a sequence of strokes are generated in a predetermined pattern. A system disclosed in U.S. Pat. No. 3,305,841 is representative of this current practice.

To minimize the number of bits required to generate a symbol, i.e., to provide deflection and intensity control, various data compression techniques may be employed. For example, all strokes may be uniformly spaced so that to progress from one stroke to the next, the deflection control system can be automatically incremented a predetermined or preprogrammed amount in a direction normal to the strokes (along the X axis assuming an upright symbol on a horizontal line). To actually generate the symbol, it is then simply a matter of programming the intensity control in terms of turn-on and turn-off points for the beam in each stroke.

The control data can be further compressed by specifying the turn-on and turn-off points of only the first stroke relative to a fixed baseline, e.g., by specifying the points in terms of units of stroke length from a baseline. The turn-on and turn-off points of each successive stroke are then specified in terms of changes or "deltas" in the respective turn-on and turn-off points, i.e., by specifying the points in each stroke relative to corresponding points in the preceding stroke. In the case of a stroke having a discontinuity with the preceding stroke, such as for generating the dot over the letter *i*, the first stroke of the dot would be treated in the program the same as the first stroke of the symbol to specify the turn-on and turn-off points with reference to the baseline. The points in subsequent strokes are then specified only as changes as before until the end of the symbol is reached. The end is signified by a programmed code in the stream of codes used to specify the changes. An example of this data compression technique may be found in U.S. Pat. No. 3,471,848.

A system utilizing a symbol generator for display, or film recording, of text may be organized in the following manner. The text is first keyboarded into a data processing system. The keyboarded data are continuously stored in a bulk memory, such as a magnetic disc or tape. A central processing unit then accepts and buffers the data from the bulk memory for processing through to the face of a CRT for display. A camera system photographs the face of the CRT if a film record is desired. The film can later be used to produce plates for offset printing of copies. The CRT system is provided with a programmable control of typically 16,000 by 16,000 points, and can be driven to produce 5,000 or more symbols per second, each being accurately positioned and uniquely drawn to a specified font.

The central processing unit is a programmed digital computer provided with a repertoire of symbol control codes that may be called out of a core memory storage. Typically, a standard set of symbols will be stored for each of the fonts required by the stored program. Because each symbol for each font requires a separate packed stream of control codes to be stored, the need for compression of the control data can be readily appreciated. To provide greater flexibility in the composition of the text and the format used, without having a provide additional sets of symbols, it is desirable to be able to vary the size of any symbol called out.

A common technique for varying size consists of counting units of stroke length at a programmed clock rate while a stroke generator produces the strokes at a standard rate. Changing the clock rate then changes the height of the symbol. The width of the character is changed proportionately by changing the predetermined stroke spacing and varying the beam diameter by adjusting the CRT focus through an 8-bit register loaded by the stored program of the data processing system. In that manner the size of the symbol may be changed without distortion.

The degree to which size may be varied by changing the clock rate is a function of the degree of clock rate control available. For example, if the clock rate is halved the size is doubled. If halved again, the size is further increased by a factor of two. To be able to control the size to a virtually infinite degree from some maximum to some minimum, without a rather elaborate and complex control for the clock rate, imposes a problem. The capability of providing italicized symbols in all sizes without further complicating the control system in general and the size control in particular, imposes still another problem.

Yet another problem is providing a baseline for the symbols to be produced. Since a certain space bounded between two parallel lines will define a line of text, it would be appropriate to use one of the two lines as the baseline. Prior art systems have elected the upper line since some symbols, notably some lower case letters, extend below the lower line. With the baseline at the top, every stroke can be referenced to the baseline without any difficulty, and simply continued down below the lower line as far as necessary to complete the symbol. A disadvantage of that solution is that most lower case letters do not extend to the upper line so that in most cases, each stroke must traverse the empty space above the symbol before the beam is turned on. Once the beam is turned off for the last time in a given stroke, that stroke can be terminated, but for most strokes, the beam will have been deflected from the upper line, the baseline, to the lower line. It would be better to start the strokes at the lower line and thus be able to terminate a majority of the strokes once the beam has been turned off for the last time well before the beam has been deflected the full space between the lower and upper lines. The time saved in each line of composition would be significant, but the problem then is to accommodate symbols that extend below the lower line if that lower line is to be used as the baseline.

OBJECTS AND SUMMARY OF THE INVENTION

An object of this invention is to provide improved size control for the generation of symbols.

Another object is to provide a slant control for italicized symbols.

Yet another object is to provide an easily programmed means for rotating a symbol.

Still another object is to provide a baseline reference at the bottom for every symbol of a line of composition with an accommodation for symbols which extend below the line of composition.

These and other objects of the invention are achieved in a symbol generator of the type described using two digitally controlled analog integrators, one for each of two orthogonal (X and Y) axes of a cathode-ray tube (CRT) display to generate strokes. The inputs to the integrators are from separate digital-to-analog converters connected to separate holding registers. The rates and polarities of change in the outputs of the integrators are directly and separately controlled by digitally coded numbers loaded into the holding registers by a stored program in a data processing system. The combined X and Y deflection rates cooperate to generate strokes for upright symbols (when one of the rates is zero), and to generate strokes for italicized symbols and rotated symbols, as required by the stored program. The ratio of one number to the other is the tangent of the slant required for the strokes of the symbol. The magnitudes of the numbers may be changed for a symbol under programmed control when the symbol size is to be changed. Size of the symbols can be further controlled by programming the clock rate at which units of stroke length are counted out for the purpose of turning the beam on and off at the right times. Assuming $2^N$ different clock rates can be programmed, the repertoire of symbols can be specified with any one of $2^N$ sizes with clock control alone. Now adding the programmable holding registers with a capacity for binary numbers of $2^M$ digits, excluding sign, provides $2^{N+M}$ different symbol sizes that can be specified for each symbol. Symbol and stroke spacing are controlled by updating main digital-to-analog converters at the beginning and end of a symbol, and at the beginning of each stroke. These main digital-to-analog converters provide static beam deflection voltages during a stroke. Those voltages are added to the outputs of the integrators. Each stroke is commenced at a baseline at the bottom of a line of symbols. For symbols which extend below the baseline, a baseline offset is programmed and entered in the main digital-to-analog converters. Offset along the axis orthogonal to the baseline may also be programmed, along with baseline offset, for italicized symbols.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
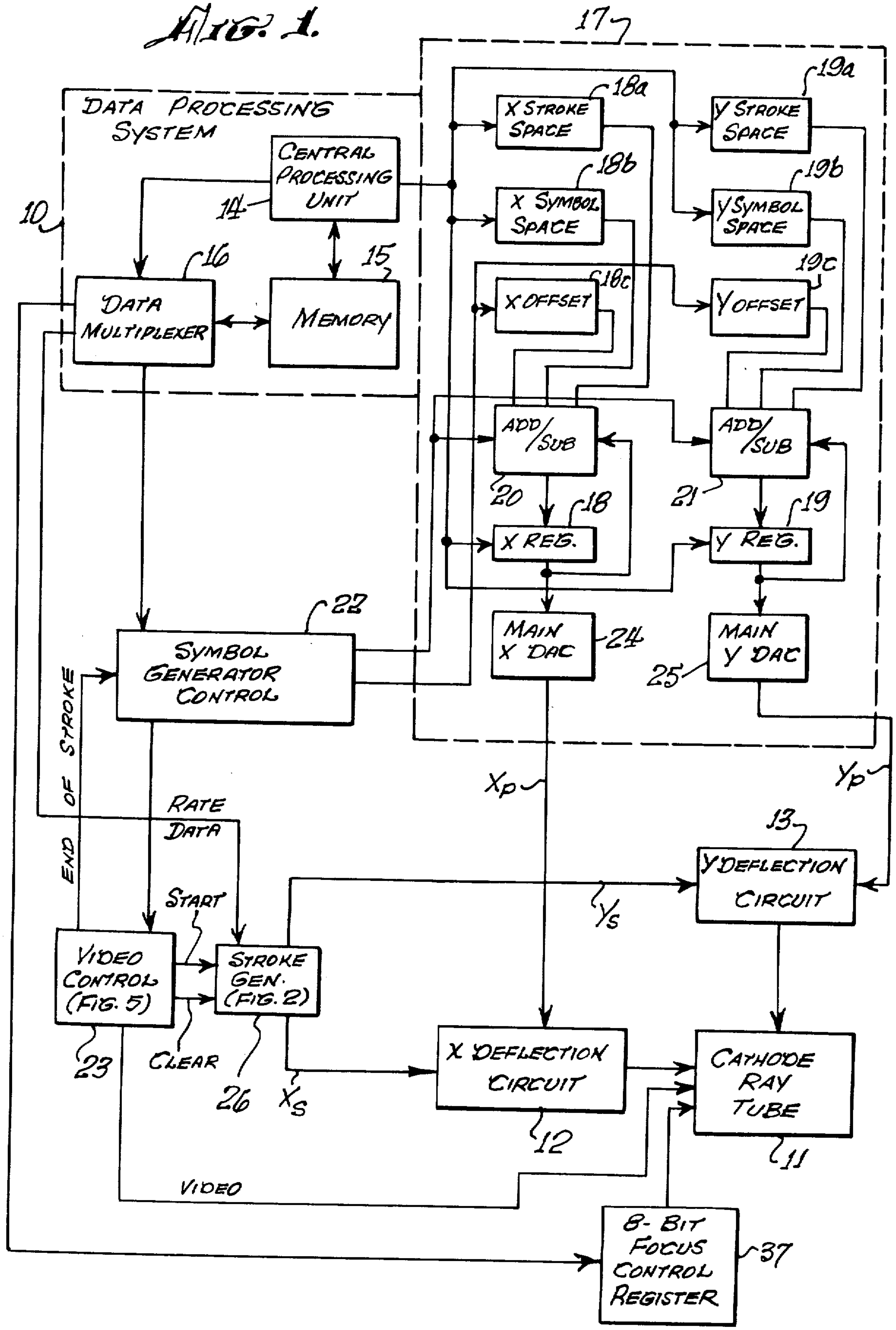
FIG. 1 is a block diagram of a system embodying the present invention.

The block diagram of FIG. 1 indicates generally the flow of information from a data processing system 10 to a cathode-ray tube (CRT) 11 for display of a selected symbol using a selected starting point at X and Y coordinates set by applying analog signals $X_P$ and $Y_P$ to conventional X and Y deflection circuits 12 and 13.

The data processing system has heretofore been commercially available from Information International, Inc., in a system model FR-80, a computer output microfilm recorder. It comprises a central processing unit 14, a memory 15, and a data multiplexer 16 for transferring out of memory data to be displayed. The memory 15 is a single randomaccess core memory for storing 18-bit words used by the central processing unit for both data processing and data display. The memory 15 could also be two memories, one for data processing and one for data display through the data multiplexer 16 under control of the central processing unit. In either case, the central processing unit is programmed to control the display of a given symbol by calling out of memory of a unique coded sequence of descriptors that are economically packed into a serial data stream.

Techniques for the reduction of the number of descriptors, and the number of bits for each descriptor, not only alleviates the memory cycle demands of the system, but also frees more memory space for other programming. However, it is to be understood that the present invention relates only to beam deflection control and not to beam intensity control of the CRT, i.e., the invention relates to only the X and Y deflection channels of the CRT, and not the intensity channel. The programmed descriptors for generating a given symbol turn the beam on and off at appropriate times during successive parallel strokes, and terminate each stroke after the beam is turned off for the last time. In that manner, a symbol is drawn on the face of the CRT by a series of parallel spaced strokes under programmed control. All that is required is for the central processing unit to call out the symbol to be displayed once the starting point and size is specified, together with any slope required. Any axis offset required is included in the description programmed for the symbol generation.

The data multiplexer is activated by the central processing unit for reading out of memory the proper sequence of descriptors for the generation of the symbol called for. The data multiplexer then controls the reading out of the descriptors from successive memory locations with a minimum of interruption of the central processing unit until the full symbol has been displayed.

A point plotting control unit 17 receives from the central processing unit (CPU) the X and Y coordinates of a starting point for a symbol to be displayed. The control unit 17 enters the starting point data in respective static registers 18 and 19. Note that in displaying a line of symbols (letters, numerals, punctuation, etc.), such as a line of text from a page, only the starting point for the first symbol is specified by the CPU through the control unit 17. The starting point for each subsequent symbol is developed in the appropriate one of the X and Y registers by simply adding a programmed symbol spacing. As each stroke of a symbol is completed, the contents of the appropriate one of the X and Y registers are automatically incremented by a stroke spacing amount programmed for the line of data to be displayed.

The symbol spacing and stroke spacing amounts are usually specified by the stored program of the CPU for the entire line of data to be displayed, although the display of a line could be terminated or otherwise interrupted by the program after the conclusion of any particular symbol to introduce a new symbol spacing and/or stroke spacing, by simply substituting new spacing quantities in the control unit 17. The stroke spacing quantities are stored in static registers 18*a* and 19*a* within the control unit 17, and are added or subtracted, according to the programmed symbol orientation, to the appropriate one of the X and Y registers through adder-subtractors 20 and 21 at the end of each symbol stroke. The symbol spacing quantities are stored in static registers 18*b* and 19*b* within the control unit 17, and are added or subtracted according to the programmed display line orientation. For horizontal line display, the vertical symbol and stroke spacing requirements are, of course, zero so that only the contents of the X-register are incremented by the symbol and stroke spacing quantities at the appropriate times under the respective control of a symbol control unit 22 and a video control unit 23. Thus, when the last stroke has been completed and the offsets have been restored, the symbol spacing is added to the contents of the X-register to define the starting point of the next symbol. X and Y offset values from bit streams unpacked by the control unit 22 and stored in static registers 18*c* and 19*c*, respectively, within the control unit 17. The process is repeated until the end of the line is reached. The starting point for the next line is then entered into the X and Y registers 18 and 19.

For simplicity it is assumed that only horizontal or vertical lines of symbols will be displayed. For horizontal lines only the X-register is incremented in the process of displaying one line of data, as just noted. For vertical lines, only the Y-register is incremented in the process of displaying a line of data. Display along a line at an angle less than ±90° from the horizontal could also be provided. In that case, the data processing system would resolve the symbol and stroke spacing quantities into the appropriate X and Y components, and both of the X and Y registers 18 and 19 would be updated. To properly orient the symbol on this sloping line, the spaced parallel strokes of the symbol would be rotated through the appropriate angle by control of the signs and quantities of programmed stroke generating control values which will now be described.

Main digital-to-analog converters 24 and 25 convert the digital coordinates stored in the respective X and Y registers to the analog deflection control signals $X_p$ and $Y_p$. Each deflection circuit includes at its input a summing amplifier to add symbol stroke signals $X_s$ and $Y_s$ generated by a stroke generator 26. The stroke signal $X_s$ is normally zero for all symbols displayed upright on a horizontal line while the stroke signal $Y_s$ increases from zero at a programmed rate until the end of the stroke is detected by the video control 23. That programmed rate provides direct control over the symbol height because, as will become more apparent from the following discussion, a full stroke is timed for a predetermined maximum number of clock pulse periods. If that timing remains constant, a higher rate for the stroke signal $Y_s$ will produce a longer stroke.

It has been the practice to control the symbol height by simply programming the clock pulse rate. That type of size control is retained in this system, but since that is independent of the programmed stroke rate, the result of using both types of size control is a greater degree of control of size for a single preprogrammed symbol. Assuming there are $2^6$ different sizes that may be programmed by control of the clock pulse rate, and $2^9$ different stroke rates that can be programmed, then there are $2^{15}$ different symbol sizes that can be displayed from a single bit stream of packed binary coded fields. Assuming that the analog integrators saturate at approximately 1/16 of full screen and that there are only 16,000 discernable points over the entire screen, then the $2^{15}$ different sizes are restricted to an area of approximately 1000 discernable points. From this it can be seen that exceptionally small changes can be made, i.e., that exceptionally fine size control can be achieved.

Figure 2:
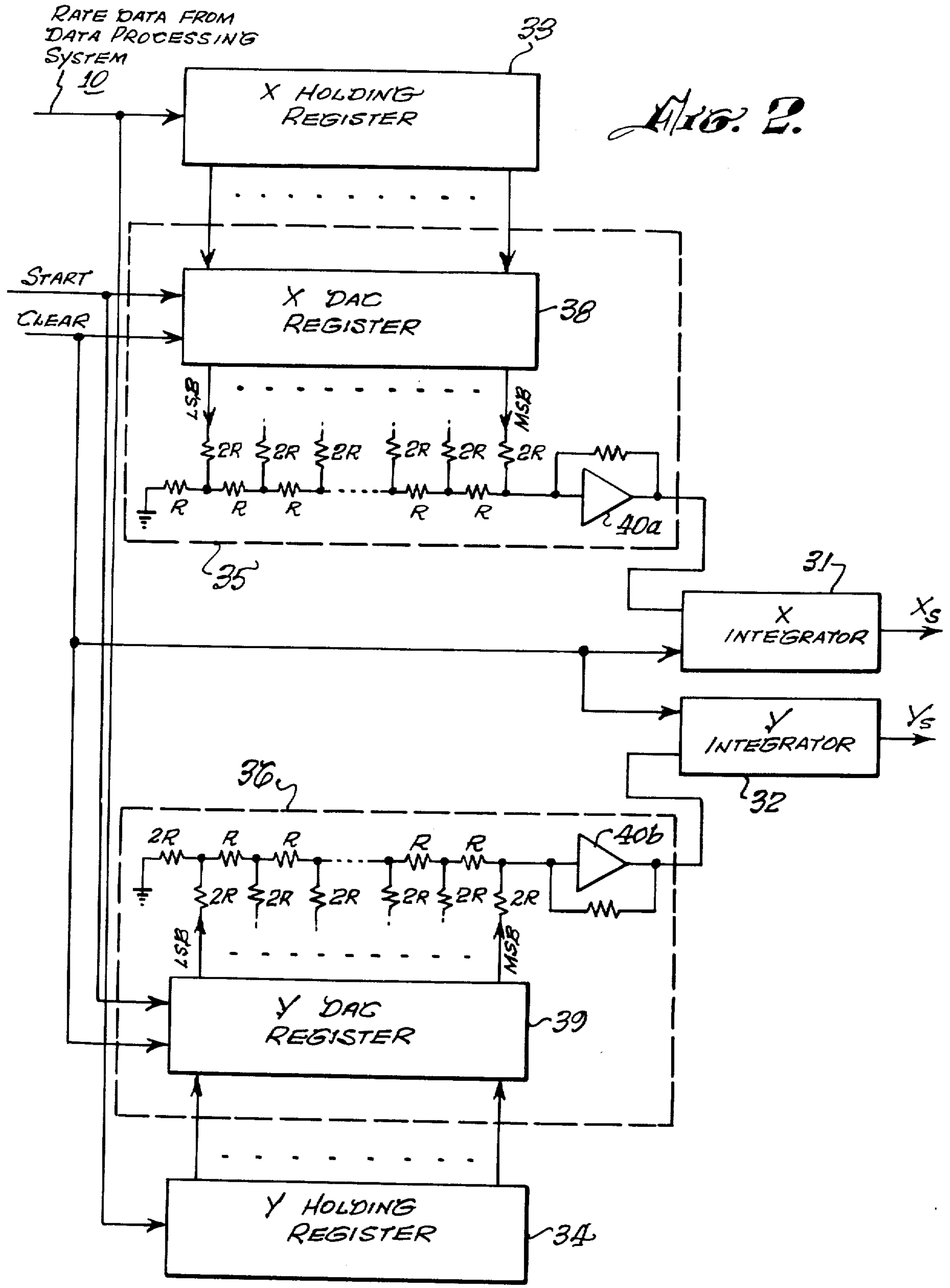
FIG. 2 is a block diagram of a stroke generator provided in the system of FIG. 1 in accordance with the present invention.

Implementation of the stroke generator 26 is shown in FIG. 2. It is comprised of two integrators 31 and 32 for the respective X and Y deflection axes. The stroke signal rates are set by programmed loading of X and Y holding registers 33 and 34. This is done directly by computer control, and not via the symbol generator control unit 22, which unpacks the bit stream of packed fields, because symbol size is generally specified for an entire line or page of data to be displayed. Once loaded, the holding registers continue to store the stroke rate data (9 bits plus a sign bit). When a stroke is started under control of the symbol generator control unit, the contents of the X and Y holding registers are loaded into X and Y digital-to-analog converters 35 and 36 to produce analog voltages proportional to the numbers loaded. The analog voltages in turn drive the integrators 31 and 32. The greater the voltage driving an integrator, the greater the rate of change in the stroke signal, and the greater that rate of change, the greater the height of the symbol. To increase the width of a symbol in proportion to the programmed increase in height, the programmed spacing between strokes is increased proportionately. As spacing between strokes is increased, the CRT beam diameter is increased proportionally by defocusing the CRT. That is done by loading a focus control register 37 in FIG. 1 with an 8-bit focus control value. The programmed stroke spacing and focus control must also take into account the programmed clock rate for the video control since that also controls size, as noted hereinbefore.

Symbols will most often be displayed upright on a horizontal line so as to require only vertical strokes. This requires the X digital-to-analog converter (DAC) 35 to be set to zero. When the symbol is italicized, but otherwise oriented in the usual way with repsect to the horizontal line, both holding registers 33 and 34 contain positive numbers whose ratio is the tangent of the required stroke angle. The number in the X holding register is usually quite small to produce a normal italicized symbol with an inclination of about 17° as shown for the lower case letter *i* in FIG. 3. To rotate a symbol, the signs and quantities stored in the holding registers are manipulated to provide not only the desired rates but also polarities of the signals $X_s$ $Y_s$. The X and Y DACs comprise X and Y DAC registers 38 and 39, respectively, the outputs of which are coupled to summing amplifiers 40*a* and 40*b* through R-2R voltage ladder networks to convert the binary numbers in the DAC registers to proportional voltages. The most significant bit (MSB) is the sign bit, and is a bit 1 for a positive number and a bit 0 for a negative number. The sign bits determine the polarities of the inputs to the integrators, and the remaining bits control the amplitudes. Thus, by programming the signs of the numbers stored in the holding registers, and by programming magnitudes of the numbers, the strokes produced can be rotated through any angle with respect to the vertical.

To enhance the italicized nature of a symbol, it is often the practice to offset the baseline of the symbol, i.e., to commence the symbol slightly below the line of data in which it appears. It is also sometimes desirable to offset the symbol slightly in a direction parallel to the line of data. To provide this offset, or any other desired offset, such as to display a subscript numeral or to commence a symbol below the line of data as in the case of many lower case letters, offset values are stored in respective X and Y offset fields in the stored streams of binary digits which control the beam intensity. These X and Y offset fields are read out first and stored in respective X and Y offset registers 18*c* and 19*c* of the control unit 17. These offset values could be specified and entered in these static registers, but since the amount of offset required is a function of size, it is preferred to precompute and store them in the memory 17 for all symbols of a set to be used.

As just noted, baseline offset is also used for any symbol having any part which extends below the line, such as the lower case letters *y* and *g*. This is for the reason that all symbols are generated using parallel strokes starting at the bottom. For most symbols the lower boundary line of the space for a line of data is used as the baseline. Since the majority of the lower case letters do not extend to the upper boundary line, each stroke used to generate the symbol can be terminated once the beam has been turned off for the last time, thereby conserving a significant amount of time in displaying a line of data. This has only the slight disadvantage of requiring a baseline offset for the symbols which extend below the baseline, but the time saved far outweighs the disadvantage since the offset can be easily contained in the packed bit streams stored in memory for the different symbols of the different fonts, and requires no additional hardware once the capability for axes offset is provided for italicized symbols.

Figure 3:
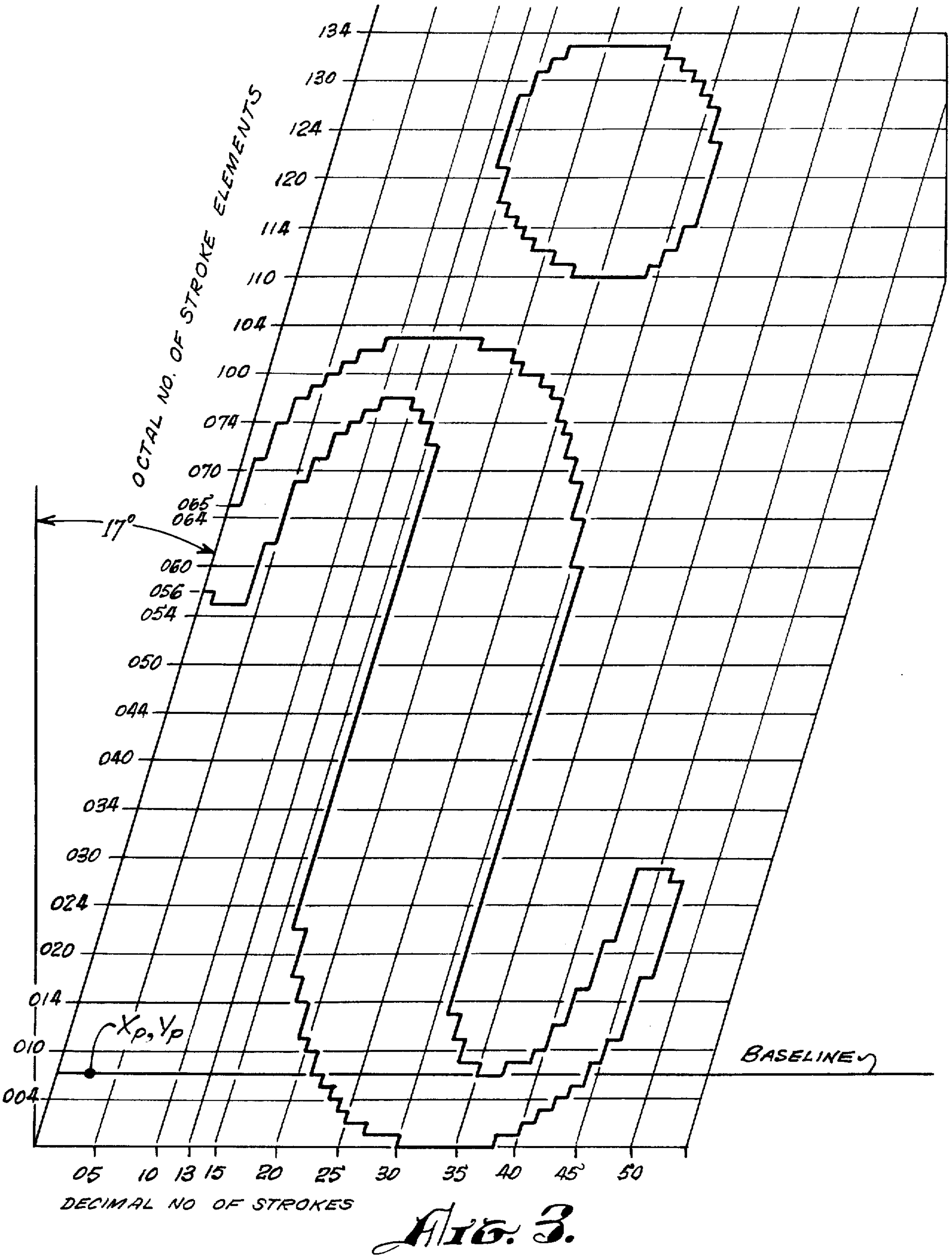
FIG. 3 shows an italicized symbol having an X and Y offset for illustration of important features of the present invention.

FIG. 3 illustrates an italicized lower case *i* to be generated by using upward strokes or vectors at an angle of 17° from the vertical. Forty-seven strokes are required starting on the left. The slope of 17° is programmed by storing numbers *x* and *y* (whose ratio *x:y* is the tangent of the stroke angle) in the respective X and Y holding registers 33 and 34 in the stroke generator 26. This is done by the data processing system under an italics mode command which remains in effect until terminated by another command that changes the contents of the X and Y holding registers, usually after a number of symbols have been generated.

At the time the symbol is to be generated, the X and Y registers 18 and 19 are set for the point $X_p$, $Y_p$ shown in FIG. 3, but since the symbol is an italicized font, the symbol is to extend below the baseline six units of stroke length, where each unit is metered by a clock pulse in a programmed clock pulse generator of the video control 23. To introduce that baseline offset, a Y axis offset of six units is subtracted from the contents of the Y register 19 via the adder/subtracter 21 by the symbol generator control unit 22. The inputs to the adder/subtracter are selected at input gates thereof under control of the symbol generator control unit 22, as is the operation of subtraction or addition.

Slanting the symbol to the right and offsetting the baseline only would have the effect of shifting the symbol to the right, in this case a shift of two units along the X axis. To eliminate that virtual shift, the Y axis (now sloping 17° from the vertical) is offset by introducing an X axis offset of two units. That is done by subtracting from the contents of the X register 18 via the adder/subtracter 20 an X axis offset of 2 units under the control of the symbol generator control unit 22. If only baseline offset were involved, as for symbols of unitalicized fonts, the X axis offset would be zero. Otherwise, the axis offset preparation is the same for the symbol to be generated next under programmed control via the symbol generator control unit. Once the last stroke of the symbol has been completed any X or Y offset is restored by the reverse of the operation used to introduce the offset at the beginning before the first stroke was started.

Since the symbol illustrated in FIG. 3 involves offsetting both axes as well as sloping the strokes, it serves to illustrate several important features of the present invention, including size control through the programmed loading of the X and Y holding registers. In the case of nonitalicized symbols, the X holding register 33 is set to zero and only the Y holding register 34 is loaded to provide size control by control of stroke rate.

Figure 4:
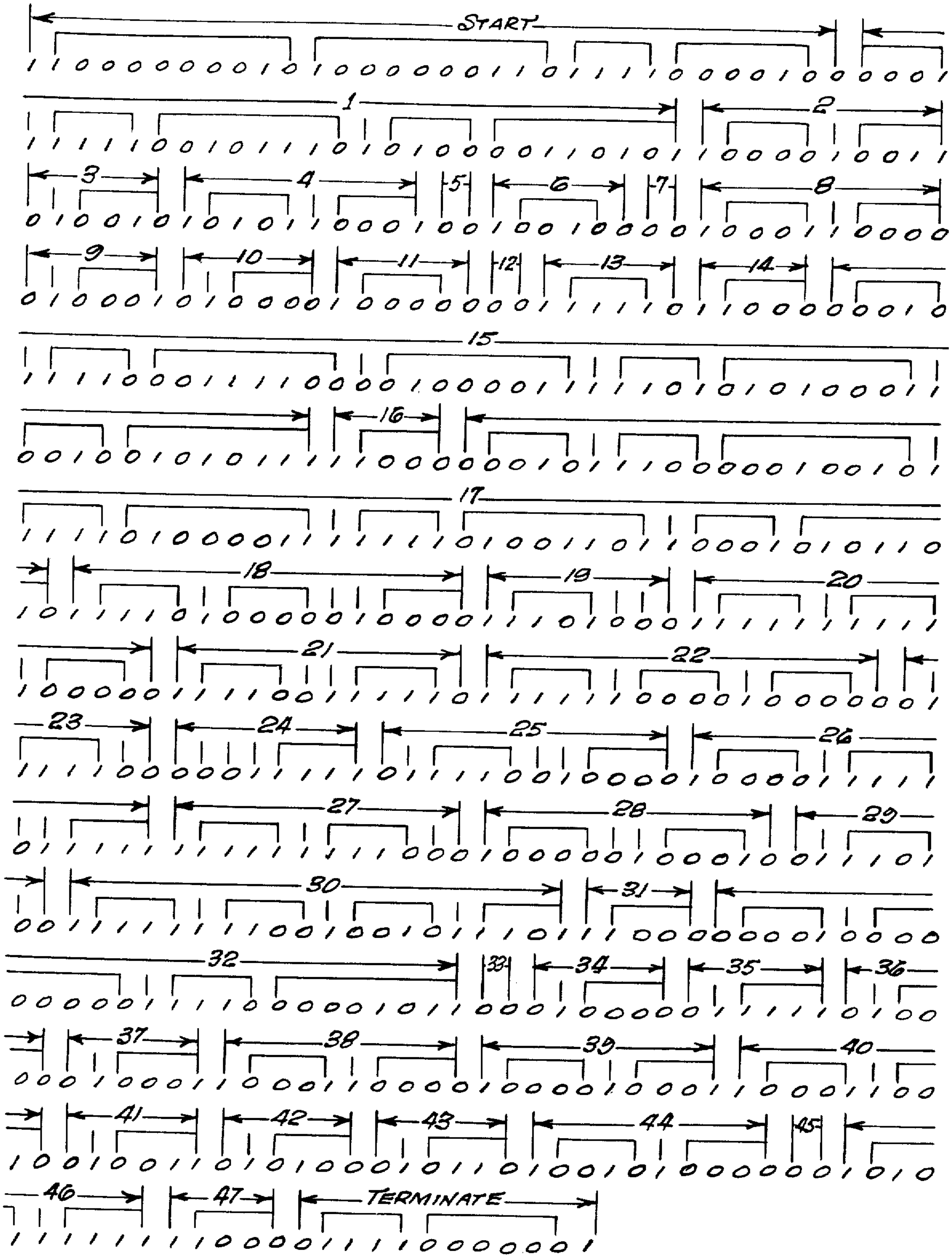
FIG. 4 shows the intensity control coding required for the generation of the symbol of FIG. 3 and the preliminary axis offset desired for the symbol.

Programming video control of the CRT for generating a symbol is per se a feature of this invention. Nevertheless, a preferred programming technique for that control will now be described for the italicized letter of FIG. 3 with reference to FIG. 4 which shows that the bit coding for the 47 strokes required. Following the code field for the last stroke, there is a field of 12 bits which signify a command to terminate the symbol. Preceding the code field for the first stroke there are field bits which provide the axis offset data required by the symbol. The control codes are packed in memory and read out for sequential processing from START to TERMINATE in 18-bit words, i.e., read out of memory 18 bits at a time. The symbol generator control unit unpacks the bit stream for the use which will now be described. Terminology will include the use of the word "element", which is defined as a segment of a vertical stroke during which the beam is on. For example, a stroke at the center of the lower case *i* has two elements, the first for the body and the second for the dot. There may be as many as 14 elements but usually not more than three, and in the case of the lower case *i*, not more than two.

Before progressing with a detailed description of how the code fields are used, it should first be understood that data compacting has been achieved by specifying the beginning and end of each element by simply specifying the change (increment or decrement) from the preceding stroke. This change is referred to hereinafter as a delta. Only the first, fifteenth, seventeenth, thirty-second and thirty-third strokes require the elements to be specified relative to the baseline. This is because for the first there is, of course, no preceding stroke, and for the fifteenth and thirty-third strokes the number of elements is changed, and for the seventeenth and thirty-second strokes the required deltas are larger than can be specified by the arbitrarily selected filed of 4-bits plus sign for the deltas. The bit stream for the symbol of FIG. 3, shown in FIG. 4, will now be unpacked, starting with the very first bit and grouped into fields as follows.

| FIELD | CODE | DESCRIPTION |
|---|---|---|
| 1 | 1 | This single bit, the first, indicates that an axis offset follows. If not, the next two fields are not present, and the control unit skips to field 4. If an italicized mode had not been commanded, this single bit would indicate only a baseline (Y axis) offset and the control unit would skip to field 3. |
| 2 | 1 000 000 010 | A minus two offset is applied to the X axis. |
| 3 | 1 000 000 110 | A minus six offset is applied to the Y axis. |
| 4 | 1 111 | This 4-bit code signifies that a negative "side bearing" (backward spacing) value is to follow in the next field. If all zeros, the 4-bit code signifies a positive side bearing value is to follow. |
| 5 | 00 0010 | This 6-bit number read is loaded into a down counter within the symbol generator control unit 22. It specifies the number of times the stroke spacing value specified in advance is to be subtracted (or added in the case of a positive side bearing) to X register 18, each time counting down by one the number loaded into the down counter, before the actual process of generating the symbol is started. Here that number is 2 to shift the italicized letter i back two stroke spaces. That is done while the task of unpacking the next eight fields are unpacked for the first stroke. |
| 6 | 0 | Control bit following a side bearing number signifying unpacking is to continue. |
| STROKE 1 | | |
| 7 | 0 001 | Number of elements in strokes. |
| 8 | 1 1 111 | This is a negative 1 delta code for the on location of the following stroke (stroke 2). The code consists of a bit 1 followed by a 3-bit number plus sign. |
| 9 | 00 101 110 | ON location relative to baseline as offset for this stroke (stroke 1). |
| 10 | 1 0 100 | This is a positive 4 delta for the off location of the following stroke (Stroke 2). |
| 11 | 00 110 101 | OFF location relative to baseline as offset for this stroke (stroke 1). |

This completes the bit stream unpacking for the first stroke and initiates the drawing of the first stroke. The stroke is drawn according to the values of the ON and OFF locations; that is, the beam is turned on at location 56 and the beam is turned off at location 65. Modification of the location values by the delta values is done during the stroke in preparation for the next stroke. After the stroke is finished, the CRT beam is moved to the right by the appropriate amount and the unpacking of the serial data stream continues.

| FIELD | CODE | DESCRIPTION |
|---|---|---|
| STROKE 2 | | |
| 12 | 1 0 000 | ON delta (+0) |
| 13 | 1 0 011 | OFF delta (+3) |

This completes the serial data stream unpacking prior to starting the second stroke. The second stroke will be turned on at location 55 and turned off at location 71. It should be noted that the ON and OFF deltas (−1,+4) that were unpacked prior to the first stroke were not used on the first stroke. They are used to compute the ON and OFF locations of the second stroke while the first stroke is in progress. The deltas for the third stroke are unpacked prior to the starting of the second stroke. The deltas for each stroke element defined by deltas are unpacked one stroke in advance so that the locations can be computed during the stroke following their unpacking. This eliminates the time that would be wasted in computing the locations if not unpacked until just before the next stroke in which used.

| FIELD | CODE | DESCRIPTION |
|---|---|---|
| STROKE 3 | | |
| 14 | 0 | This signifies no change in ON delta field. The 3-bit number plus sign may thus be omitted. |
| 15 | 1 0 010 | OFF delta (+2). |

This completes the unpacking for stroke 4. Stroke 3 is now drawn utilizing the deltas unpacked prior to the second stroke (0,3) so that the ON and OFF locations are 55 and 74, respectively. Similarly, the fourth stroke utilizing the deltas of 0 and 2 is drawn with ON and OFF locations of 55 and 76. Strokes continue to be drawn with the serial data unpacking pertaining only to modifications of the ON and OFF deltas. Discussion of the unpacking scheme continues after stroke 12 has been terminated.

| | | |
|---|---|---|
| STROKE 13 | | |
| 34 | 1 1 111 | ON delta (−1). |
| 35 | 0 | No change in the OFF delta. |

Stroke 13 is now drawn utilizing On and OFF locations of stroke 12 since the deltas unpacked then were both zero.

| FIELD | CODE | DESCRIPTION |
|---|---|---|
| STROKE 14 | | |
| 36 | 1 1000 | This is an ESCAPE (negative zero delta) code which signifies the end of a sequence of stroke elements defined by deltas. |
| 37 | 0 | This is a bit following an escape code that signifies unpacking of data is to continue, and that new element data will be unpacked. (If this were a bit 1, it would signify the end of the symbol.) |

Stroke 14 is now drawn utilizing deltas unpacked prior to stroke 13.

| | | |
|---|---|---|
| STROKE 15 | | |
| 38 | 0 010 | Number of elements in strokes after stroke 14. |
| 39 | 1 1 110 | This is a negative two delta code for the ON location of the first element in stroke 16. |
| 40 | 00 111 100 | ON location (74) of first element of the following stroke 15 relative to the baseline as offset. |
| 41 | 0 | This signifies a delta value of zero for the OFF location of the first element in stroke 16. |
| 42 | 01 000 011 | OFF location (103) of first element of following stroke 15 relative to the baseline as offset. |
| 43 | 1 1101 | This is a negative three delta code for the ON location of the second element of stroke 16. |
| 44 | 01 010 001 | ON location (121) of the second element of the following stroke 15. |

-continued

| | | |
|---|---|---|
| 45 | 1 0 010 | This is a positive two delta code for the OFF location of the second element of stroke 16. |
| 46 | 01 010 111 | OFF location (127) of second element of the following stroke 15 relative to the baseline as offset. |

Stroke 15 is now drawn and consists of two elements which extend from locations 74 to 103 and from 121 to 127. The presence of the escape prior to stroke 14 was necessary to change from the single element structure of strokes 1 through 14 to the double element structure of stroke 15.

| FIELD | CODE | DESCRIPTION |
|---|---|---|
| STROKE 16 | | |
| 47 | 1 1000 | Escape code. |

Stroke 16 is now drawn utilizing deltas of −2 and 0 to determine the ON and OFF locations of the first element as being 72 and 103 respectively. Deltas of −3 and +2 determines the locations of the second element to be 116 and 131. The presence of the escape code prior to stroke 16 is necessitated by the fact that the ON delta of the first element of stroke 17 would have to change by an amount beyond the seven bit range of the delta field. In this situation, it is necessary to load new locations for all elements. The unpacking of the serial data stream continues with no peculiarties until stroke 46 is finished.

| | | |
|---|---|---|
| STROKE 47 | | |
| 141 | 1 1000 | Escape code. |

Stroke 47 is now drawn with the locations of stroke 46 and the deltas determined prior to stroke 46.

| FIELD | CODE | DESCRIPTION |
|---|---|---|
| 142 | 0 | This bit following the escape code signifies that unpacking of data is to continue. If it were a bit 1, the symbol generation would be terminated, as it normally would but for a negative side bearing number which follows. |
| 143 | 1111 | This signifies a 6-bit negative (backward) side bearing number follows. |
| 144 | 00 0 001 | This is a side bearing number which calls for one stroke space backwards. |
| 145 | 1 | This bit following a side bearing number signifies termination of the symbol generation |

The axis offsets specified by the registers 18*c* and 19*c* are next restored. And finally the symbol space specified by the registers 18*b* and 19*b* is provided. Due to the negative side bearings at the beginning and the end of the symbol, the symbol actually intrudes into the stroke area of the preceding one and allows the following one to intrude in the stroke use of this one. Thus, although it takes 47 strokes to draw the symbol, the symbol has an effective width of only 44 strokes. This particular symbol requires 558 bits of data for its complete presentation including axis offsets and side bearings. This is an average of 4⅓ data bits for each ON and OFF location. If each location were addressed individually, at least eight bits per location would be required even with no provision for axis offset and side bearing. This data formatting thus reduces the number of necessary data bits by almost a factor of two. However, other data formats may be used to control the generation of a symbol.

Figure 5:
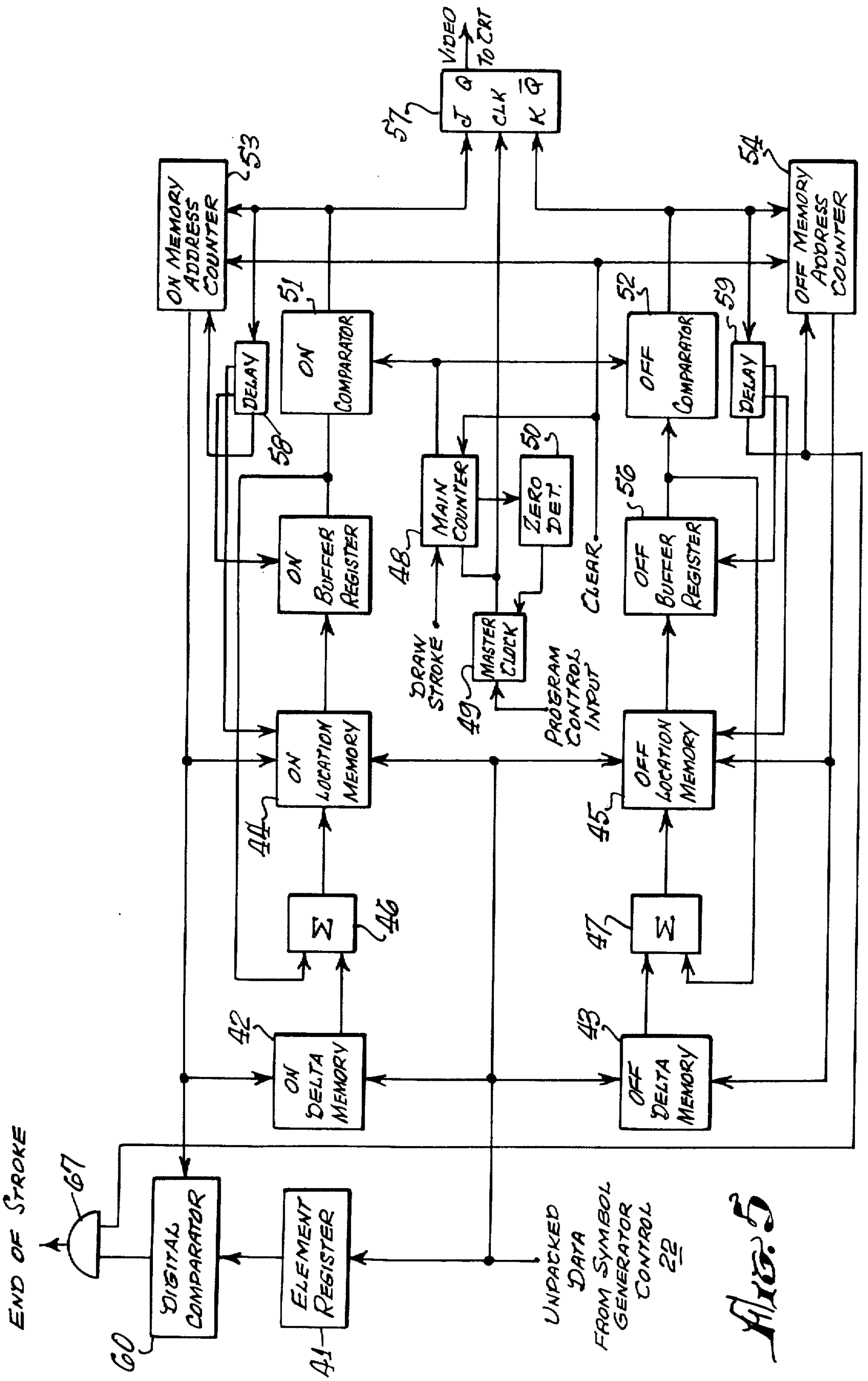
FIG. 5 is a block diagram of a video control unit which responds to the intensity control coding of FIG. 4 to display the symbol of FIG. 3 on the face of a CRT in the system of FIG. 1.

The unpacked data is employed by the video control 23 to turn the CRT beam on and off. FIG. 5 illustrates the organization of that video control. The unpacked data for a given stroke is placed in appropriate storage devices when a DRAW STROKE command is issued by the symbol generator control unit 22 (FIG. 1). The number of elements in the stroke is stored in a register 41, and the ON and OFF deltas are stored in memories 42 and 43. In the case of the first stroke, and any stroke thereafter where the ON and OFF points are specified relative to the baseline or offset baseline, the ON and OFF locations are stored in memories 44 and 45. Thereafter, new ON and OFF locations are computed and stored for successive strokes by adding ON and OFF deltas via adders 46 and 47.

The DRAW STROKE command presets a main counter 48 to a number slightly less than will produce a carry out upon counting up. That also enables the counter to start counting clock pulses from a programmable master clock 49. At the same time the control unit 22 transmits a START signal to the stroke generator 26 shown in FIG. 2. As the stroke is thus started, the main counter 48 is started with the master clock operating at a predetermined high rate and counts up until the carry out condition is detected, i.e., until the counter is advanced to all zeros. At that point a detector 50 switches the master clock to a lower rate specified by a program control input. By starting the main counter at the same number near carry out for every stroke and using the same high clock rate to count up to the carry out condition, a delay of consistent duration is provided at the beginning of each stroke before the beam can possibly be turned on and off via comparators 51 and 52. This delay allows the CRT deflection circuits to settle before actual generation of the symbol strike begins and insures that all symbols, regardless of size controlled through the master clock, will start at the same baseline.

The numbers stored in the X and Y DACs of the stroke generator will affect the position of the baseline in that the stroke rate will vary as a function of those numbers which are programmed to effect control of symbol size in cooperation with the programming of the master clock. To take that into account during the period before "carry out", the data processing system provides an adjusted beam position through the main DACs 24 and 25 in a manner which takes into account the rotation or replacement of the symbol, if any. The starting point of illumination of each character can then be digitally controlled with programmable predictability and consistency.

At the beginning of a stroke, ON and OFF memory address counters 53 and 54 are cleared by a CLEAR signal from the control unit 22. That causes the contents of the ON and OFF location memories 44 and 45 to appear at inputs of respective buffer registers 55 and 56. These registers are then loaded with the ON and OFF points of the first element of the stroke. Immediately thereafter, respective ON and OFF deltas are added to the outputs of these buffer registers. The sums are loaded into the ON and OFF location memories at the same address, thus updating the on and off points for the first element of the next stroke.

As the main counter passes through zero, the contents of the main counter are compared with the contents of the ON and OFF buffer registers. This comparison continues until the ON and OFF points for the first element are reached, at which time the comparators 51 and 52 and turn on (set) and turn off (reset) a video control flip-flop 57 and advance the ON and OFF memory counters 53 and 54 to address the on and off points of the second element, if any, in the memories 44 and 45. Those points are then updated with deltas from memories 42 and 43, and the process continues as for the first element. Delay lines 58 and 59 provide the proper timing of the actions required upon comparisons being made, which are to update to the next location values the registers 55 and 56, store the sums out of the adders 46 and 47, and then advance the address counters 53 and 54. When the last element has been turned on, and the address counter 53 has been incremented, a digital comparator 60 detects a coincidence between the output of the address counter and the number of elements stored in the register 41. It should be recalled that the memory address counter starts from zero for the first element. Consequently, if there are three elements, for example, the memory address counter is advanced to the count of two to address the turn on point for the third element in memory 44. Thereafter, upon being incremented to address what would otherwise be the fourth element turn on point, the output of the address counter is three which matches the output of the element register 41. The output of the comparator 60 enables an AND gate 61 to transmit the output signal of the delay line 59 to signify the end of the stroke when the turn off point of the last element is reached. The END OF STROKE signal thus generated is transmitted to the control unit 22 which ends the stroke by resetting the integrators 31 and 32 (FIG. 2) with a CLEAR signal and updates the X and Y registers 18 and 19 via adders 20 and 21 (FIG. 1).

What is claimed is:

1. In apparatus for displaying graphic symbols on an imaginary line on the face of a cathode-ray tube and employing a beam control system, an improvement comprising means operative on said beam control system for starting each of a plurality of parallel strokes required for each symbol on said line, and means operative on said starting means for programming an offset below said imaginary line along which spaced symbols are displayed in sequence for each stroke of a symbol in order to accommodate symbols which extend below said imaginary line.

2. In a graphic symbol generator for use with a data processing system employing a cathode-ray tube display and using two digitally controlled analog integrators, one for each of two orthogonal X and Y axes of said cathode-ray tube display to generate spaced parallel strokes, where inputs to said integrators are from separate digital-to-analog converters connected to separate registers, an improvement comprising means for programming the rates and polarities of change in the outputs of the integrators in the form of digitally coded numbers loaded into said registers by a stored program in said data processing system to provide programmed X and Y beam deflection rates which cooperate to generate strokes at an angle between 0° and 90° with respect to said axes as required in response to the ratio of one of said numbers to the other.

3. The improvement of claim 2 wherein the magnitudes of said numbers for a symbol may be changed under programmed control when the symbol size is to be changed.

4. In a programmed digital data processing system having means for generating spaced graphic symbols on a line across the face of a cathode-ray tube, said means employing X and Y deflection systems for producing spaced parallel strokes of an electron beam, said strokes beginning on a line common to all symbols as a baseline, the first of said strokes starting at a designated point specified on a coordinate system having orthogonal X and Y axes, where said X and Y deflection systems cooperate to place said beam on any point on the face of said cathode-ray tube in response to $X_p$ and $Y_p$ signals, said graphic symbol generating means having means for turning said beam on and off as required by counting units of stroke length from said baseline to determine the on and off points of stroke elements which make up the symbol, the improvement of means for starting each stroke from said baseline at the bottom of each symbol, means for terminating each stroke at the turn-off point of the last of one or more elements, and means for programming an offset of said starting point in a direction normal to said baseline according to the needs of each symbol, thereby accommodating symbols which extend below said line common to all symbols and providing for placement of any symbol above or below said line.

5. The improvement of claim 4 including means for programming an offset of said starting point in a direction parallel to said baseline for the first stroke of any symbol.

6. The improvement of claim 5 in said graphic symbol generating means in which said means for turning said beam on and off while generating a symbol is comprised of a stream of stored digital signals arranged in coded fields read and decoded as said strokes are generated, wherein said means for programming said offset comprises a field of digits programmed at the head of said programmed stream of digits for the symbol, said field specifying the magnitude and direction of offset along one of said orthogonal axes, a register for storing said offset field, and means for effectively adding or subtracting said magnitude according to said direction from a predetermined one of said $X_p$ and $Y_p$ signals.

7. The improvement of claim 6 wherein said means for programming said offset comprises a second field of digits programmed next to the first field of offset digits, said second offset field specifying the magnitude and direction of offset along the other one of said orthogonal axes, a register for storing said second offset field, and means for effectively adding or subtracting said magnitude of said second offset field according to the direction specified in said second offset field from the other one of said $X_p$ and $Y_p$ signals.

8. The improvement of claim 4 wherein said means for generating spaced parallel strokes of said electron beam comprises separate means for generating stroke signals $X_s$ and $Y_s$, and means for adding said stroke signals $X_s$ and $Y_s$ to respective point-designating signals $X_p$ and $Y_p$, each of said stroke-signal generating means being comprised of an integrator, a digital-to-analog converter for converting digital signals representing a positive or negative number to a voltage proportional in amplitude to said number with a polarity corresponding to the sign of said number, means for connecting the output voltage of said converter to said integrator to generate a ramp signal at the output of said integrator with a slope proportional to the magnitude of said number, said ramp signal having a polarity controlled by the polarity of said output voltage of said converter, a register connected to said converter for storing said digital signals representing a number to be converted, and means for entering into said register said digital signals.

9. The improvement of claim 8, wherein said units of stroke length are counted by counting clock pulses produced at a specified rate while said stroke signals are generated, and said specified clock pulse rate is programmed to control the length of each unit, thus controlling the height of said symbol, whereby programmed control of the slope of said stroke signals cooperates with said programmed control of unit length in controlling the size of the graphic symbol generated.

10. The improvement of claim 9 wherein said parallel strokes are spaced by means for adding programmed values to X and Y coordinates of said starting points at the end of each stroke, and wherein the width of said symbol is controlled by programming said values to be added to said X and Y coordinates.

11. The improvement of claim 10 including means for controlling the number of times said stroke spacing values are to be added or subtracted to said X and Y coordinates before the first stroke of said symbol, and the number of times said stroke spacing values are to be added or subtracted to said X and Y coordinates after the last stroke to affect the side bearing of said symbol relative to symbols on the same line before and after said symbol.

12. In a programmed digital data processing system having means for generating spaced graphic symbols on a line across the face of a cathode-ray tube, said means employing X and Y deflection systems for producing spaced parallel strokes of an electron beam, said strokes beginning on a line common to all symbols as a baseline, the first of said strokes starting at a designated point specified on a coordinate system having orthogonal X and Y axes, where said X and Y deflection systems cooperate to place said beam on any point on the face of said cathode-ray tube in response to $X_p$ and $Y_p$ signals, said graphic symbol generating means having means for turning said beam on and off as required by counting units of stroke length from said baseline to determine the on and off points of stroke elements which make up the symbol, the improvement of means for starting each stroke from said baseline at the bottom of each symbol, means for terminating each stroke at the turn-off point of the last of one or more elements, means for generating said strokes, means for adding programmed values to at least one of said X and Y coordinates of said starting points at the end of each stroke; and means for programming said values to be added to said X and Y coordinates, whereby width of said symbol is controlled.

13. The improvement of claim 12 including means for controlling the number of times said stroke spacing values are to be added or subtracted to said X and Y coordinates before the first stroke of said symbol, and the number of times said stroke spacing values are to be added or subtracted to said X and Y coordinates after the last stroke to affect the side bearing of said symbol relative to symbols on the same line before and after said symbol.

14. In apparatus for displaying graphic symbols on an imaginary line using a cathode-ray tube and employing a beam control system, means operative on said beam control system for starting at specified points each of a plurality of parallel strokes required for each symbol on said line, means operative on said starting means for programming an offset of said points below said imaginary line along which spaced symbols are displayed in sequence in order to specify starting points for strokes of symbols which extend below said imaginary line, and means operative on said starting means for programming an offset of said points in a direction parallel to said imaginary line from an offset position otherwise specified for italicized symbols that extend below said line as said line of spaced symbols is displayed.

15. Apparatus as defined in claim 14 wherein the slope of the strokes for a symbol is controlled for italicizing symbols by programming the relative magnitudes and signs of inputs to separate integrators which generate ramp signals added to signals for positioning starting points of strokes for a symbol, where said ramp signals are generated for beam control slong orthogonal X and Y axes, said beam positioning signals are for position control along said X and Y axes, and said ramp signals for said X and Y axes are added to beam positioning signals along respective X and Y axes.

16. Apparatus as defined in claim 15 wherein said beam is turned on and off during each stroke in response to a programmed stream of coded digital signals, and the size of a symbol is controlled by both programming a clock rate for said beam on-off control and programming the magnitudes of inputs to said integrators.

* * * * *

UNITED STATES PATENT OFFICE

CERTIFICATE OF CORRECTION

Patent No. 3,946,365 Dated March 23, 1976

Inventor(s) JOHN A. BANTNER

It is certified that error appears in the above-identified patent and that said Letters Patent are hereby corrected as shown below:

Add assignee: INFORMATION INTERNATIONAL, INC., Culver City, California.

COL. 2: line 17, "a" should be --to--.
COL. 4: line 55, "descriptions" should be --descriptors--
COL. 5: line 39, "and" should be --are--.
COL. 6: line 61, "repsect" should be --respect--.

COL. 8: line 40, "is per se" should be --is not per se--.
line 43, delete "that"
COL. 9: line 7, "filed" should be --field--.
COL. 11: line 31, "On" should be--ON--
COL. 12: line 26, "determines" should be --determine--.
COL. 13: line 59, "replacement" should be --displacement--.
COL. 14: line 12, after "52" delete "and".
COL. 18: line 7, "slong" should be --along--.

Signed and Sealed this

Tenth Day of August 1976

[SEAL]

*Attest:*

RUTH C. MASON
*Attesting Officer*

C. MARSHALL DANN
*Commissioner of Patents and Trademarks*